US006567077B2

(12) United States Patent
Inoue et al.

(10) Patent No.: US 6,567,077 B2
(45) Date of Patent: May 20, 2003

(54) TOUCH PANEL

(75) Inventors: Satoshi Inoue, Izumi (JP); Yoshikazu Tanaka, Yokohama (JP)

(73) Assignee: Touch Panel Systems Corporation, Tokyo (JP)

( * ) Notice: Subject to any disclaimer, the term of this patent is extended or adjusted under 35 U.S.C. 154(b) by 5 days.

(21) Appl. No.: 09/784,152

(22) Filed: Feb. 16, 2001

(65) Prior Publication Data

US 2002/0005838 A1 Jan. 17, 2002

Related U.S. Application Data

(63) Continuation of application No. PCT/JP99/04375, filed on Aug. 11, 1999.

(30) Foreign Application Priority Data

Aug. 18, 1998 (JP) .......................................... 10-231931

(51) Int. Cl.[7] .................................................. G09G 5/00

(52) U.S. Cl. ....................... 345/173; 345/174; 345/175; 345/176; 345/177; 345/178; 178/18.01; 178/18.03; 178/18.04

(58) Field of Search ................................ 345/173, 177, 345/174, 175, 176, 178; 178/19, 18.01, 18.03, 18.04

(56) References Cited

U.S. PATENT DOCUMENTS

| | | | | |
|---|---|---|---|---|
| 4,746,914 A | | 5/1988 | Adler | |
| 4,825,212 A | * | 4/1989 | Adler et al. | 340/706 |
| RE33,151 E | | 1/1990 | Adler | |
| 5,334,805 A | | 8/1994 | Knowles et al. | |
| 5,380,959 A | | 1/1995 | Knowles | |
| 5,573,077 A | * | 11/1996 | Knowles | 178/19 |
| 5,673,041 A | * | 9/1997 | Chatigny et al. | 341/22 |
| 5,708,461 A | * | 1/1998 | Kent | 345/177 |
| 5,739,479 A | * | 4/1998 | Davis-Cannon et al. | 178/19 |
| 5,986,224 A | * | 11/1999 | Kent | 178/18.04 |
| 6,091,406 A | * | 7/2000 | Kambara et al. | 345/177 |
| 6,236,391 B1 | * | 5/2001 | Kent et al. | 345/177 |
| 6,254,105 B1 | * | 7/2001 | Rinde et al. | 277/628 |

FOREIGN PATENT DOCUMENTS

| | | |
|---|---|---|
| JP | 63-263517 | 10/1988 |
| JP | 6-502946 | 3/1994 |
| JP | 7-5975 | 1/1995 |
| JP | 8-305481 | 11/1996 |
| WO | 92/09050 | 5/1992 |
| WO | 96/23292 | 8/1996 |
| WO | 98/29853 | 7/1998 |

* cited by examiner

*Primary Examiner*—Richard Hjerpe
*Assistant Examiner*—Jennifer T. Nguyen

(57) ABSTRACT

A touch panel comprises a substrate 11 allowing acoustic wave to be propagated and a transducer 13*a*, mounted to this substrate, for transmitting or receiving the acoustic wave. A chamfered portion 16 is formed in the end face or the corner portion of the substrate 11 to make the acoustic wave turn around and be propagated from the front surface to the rear surface through the end face of the substrate 11. The acoustic wave propagated through the chamfered portion is received by the transducer 13*a* placed on the rear surface of the substrate 11. The radius (R) of the chamfered portion 16 of the substrate is 0.5 mm or more. This touch panel may prevent from forming raised portions on the front surface of the propagation medium, so that the touch panel may be enhanced in applicability to thin LCD monitors, and simplified in structure.

11 Claims, 8 Drawing Sheets

TOUCH PANEL

This is a Continuation Application of PCT International Application No. PCT/JP99/04375, filed Aug. 11, 1999.

TECHNICAL FIELD

The present invention relates to a touch panel (or a touch sensor or touch screen) to input/output coordinate information on touch-positions touched with fingers or the like, and more particularly to a touch panel (or a touch-position detecting device) having transmitting and receiving elements to utilize acoustic wave (e.g. surface ultrasonic wave).

BACKGROUND ART

As primary type of the touch panels, there have been known the surface ultrasonic wave type, the resistance film type, the electrostatic capacity type, the electromagnetic induction type and others. Among these types, the surface ultrasonic wave type includes one known method in which transmitting and receiving transducers are placed opposite each other in both directions of X and Y axes of the surface of a propagation medium, such as a glass substrate, to detect the touch-positions.

On the other hand, as a widely popularized method in recent years, there has been known a method in which respective pairs of transmitting and receiving transducers (four transducers in total) for detecting respective X and Y coordinates or coordinate values are placed in a propagation medium through an array of reflective elements to detect the touch-positions (U.S. Pat. No. 4,746,914, U.S. Reissue Pat. No. 33151 and International Patent Laid-Open Publication WO 96/23292). In this method, a wend face type transducer is used to simultaneously switch over a transmitting circuit and receiving circuit of an electric signal processing circuit (controller) in order to process respective signals of X and Y axes. Using such a signal processing leads to two partially or entirely duplicate groups not only of the switching circuit but also of the transmitting and receiving circuits in the controller, which results in complicated circuit structure and signal processing as well as increased cost.

Further, when the aforementioned transducer is mounted on the surface of the propagation medium, a raised portion is formed on the surface of the propagation medium. This makes difficult to arrange a liquid crystal display apparatus (LCD), particularly a thin LCD monitor to the propagation medium.

Thus, it is an object of the present invention to provide a touch panel or touch-position detecting device capable of preventing from forming raised portions on the surface of the propagation medium to enhance applicability to the thin LCD monitor and to simplify its structure.

It is another object of the present invention to provide a touch panel capable of reducing the number of transducers and simplifying circuit structure and signal processing.

DISCLOSURE OF INVENTION

The inventors of the present invention noted the fact that a small gap was essentially caused between the rear surface of a propagation medium (panel) and a display apparatus. As a result of their sedulous studies for achieving the aforementioned object, they have found out that when the end face or corner portion of the propagation medium allowing acoustic wave (surface ultrasonic wave) to be propagated was chamfered or rounded, the acoustic wave could turn around and be propagated from the front surface to the rear surface of the propagation medium, or from the rear surface to the front surface of the propagation medium, through the chamfered portion (rounded portion or propagation-direction changing portion), and the present invention eventually has been completed.

Specifically, a touch panel (touch-position detecting device) according to the present invention comprises a medium allowing acoustic wave to be propagated and a transducer, mounted on this propagation medium, for transmitting and receiving the acoustic wave, wherein the end face or the corner portion of the propagation medium is chamfered. In such a touch panel, the acoustic wave may be propagated bidirectionally between the front and rear surfaces of the acoustic wave propagation medium through the chamfered portion (propagation-direction changing portion). Thus, the transducer may be mounted on the front surface and/or rear surface of the acoustic wave propagation medium. In the touch panel, the corner portion of at least one of the front and rear surfaces of the acoustic wave propagation medium and the side surface of the acoustic wave propagation medium (i.e. an edge at which the front or rear surface of the propagation medium intersects the side surface thereof) is chamfered, and then a transducer may be mounted on the side surface of the propagation medium.

Further, when the end face is chamfered, the acoustic wave may be propagated in the reverse direction (i.e. from an X-axis direction to a negative (−) X-axis direction) through the chamfered portion (direction changing portions), and otherwise, when the corner portion is chamfered, the acoustic wave may be directionally changed from the X-axis direction to a Y-axis direction through the chamfered portion (direction changing portions).

Furthermore, when a V-shaped (or valley-shaped) cut portion or an chevron-shaped raised portion is formed and this cut or raised portion (direction changing portion) is chamfered, the acoustic wave propagated from the X-axis and Y-axis directions on one surface of the propagation medium may turn around and converge through the chamfered portion (direction changing portions). In other words, when the acoustic wave are transmitted from a convergent portion on another surface of the propagation medium, the acoustic wave on the one surface of the propagation medium may be propagated with making it branch into the X-axis and Y-axis directions. Thus, the transducer may be mounted at the aforementioned convergent area or branch area, and this allows a single transducer to transmit and receive the acoustic wave in the X-axis and Y-axis directions.

Utilizing such a chamfered portion (direction changing portion) allows the acoustic wave to be propagated from one surface to the other surface of the propagation medium, so that at least one transducer may be mounted on the rear surface of the propagation medium. For example, the transmitting and receiving transducers may be made up of two or three transducers.

The radius (R) of the aforementioned chamfered portion is typically 0.5 mm or more.

The present invention also includes a touch-position detecting device comprising a medium which allows acoustic wave to be propagated in the X-axis and Y-axis directions thereof, at least one transmitting transducer, mounted on the propagation medium, for generating the acoustic wave in the X-axis and Y-axis directions, a chamfered portion (direction changing portion), formed at the end face and/or corner portion of the propagation medium, for making the acoustic wave from the transmitting transducer being propagated from the front or rear surface to the rear or front surface of the propagation medium, and at least one receiving transducer, mounted on the propagation medium, for detecting a touch-position of the X-axis and Y-axis coordinates by use of the acoustic wave which has turned around and been propagated through the chamfered portion.

Such a touch panel utilizes a characteristic that acoustic wave (e.g. surface ultrasonic wave or the like) is propagated straight on the surface of a propagation medium. Specifically, when the acoustic wave turns around the end face of the panel, it spirally travels on the surface having semicircular shape in section. Thus, the acoustic wave generated on the rear surface of the touch panel turns around the end face of the panel and is then guided to the front surface as a touch surface. When the acoustic wave are propagated on the surface of the propagation medium, the traveling direction of the acoustic wave may be easily understood by referring a development view for the propagation medium which is a hollow and made up only of a shell. For example, as shown in FIG. 1, the traveling direction (see the arrow) of the acoustic wave traveling on the spherical surface of a sphere 1 corresponds to the outline of a section made by cutting the sphere along a plane including the center of the sphere 1. As shown in FIG. 2, when acoustic wave travels on the surface of a columnar propagation medium 2, it spirally travels on the surface of the propagation medium as shown by the arrow. Thus, when the end face or corner portion of the propagation medium is chamfered and processed into a gentle surface (curved surface), the acoustic wave are directed from one of the front and rear surfaces of the propagation medium to another surface practically without any loss.

The term "surface" herein refers to the vicinity of the surface of a propagation medium or the surface layer of the propagation medium, on which acoustic wave is propagated.

BEST MODE FOR CARRYING OUT THE INVENTION

The detail of the present invention will now be described with reference to the appended drawings.

Figure 1:
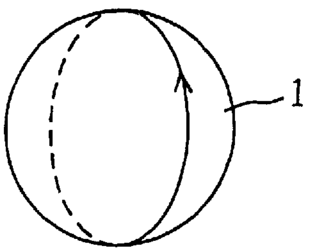
FIG. 1 is a schematic view illustrating the traveling direction of acoustic wave in a touch panel according to the present invention.
Figure 2:
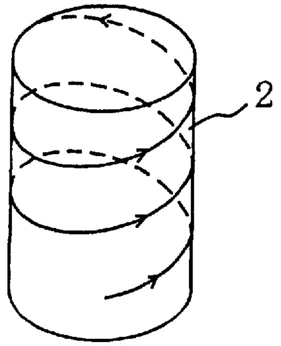
FIG. 2 is a conceptual diagram illustrating the traveling direction of acoustic wave in a touch panel according to the present invention.
Figure 3:
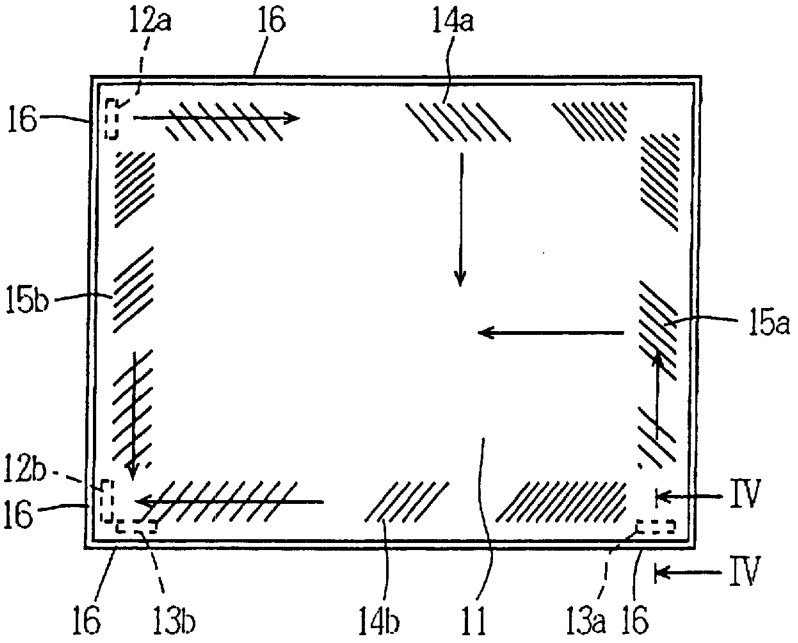
FIG. 3 is a schematic plan view showing one embodiment of a touch panel according to the present invention.
Figure 4:
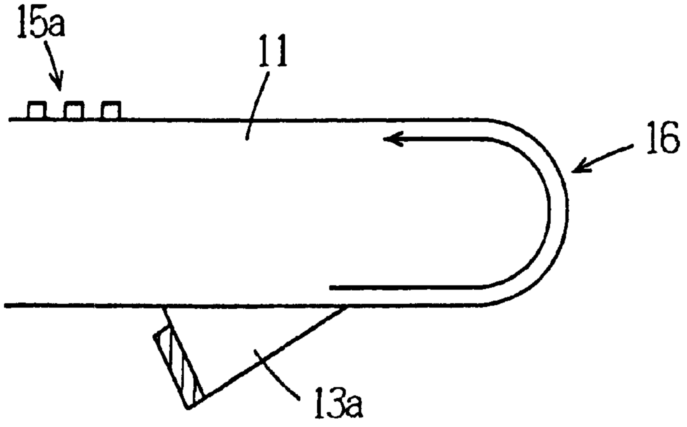
FIG. 4 is a schematic sectional view taken along the line IV—IV in FIG. 3.

FIG. 3 is a schematic plan view of one embodiment of a touch panel according to the present invention, and FIG. 4 is a schematic sectional view taken along with the line IV—IV of FIG. 3.

A touch panel (or touch-position detecting device) shown in FIG. 3 is made of glass or the like, and comprises a planar rectangular substrate 11 as a propagation medium which allows acoustic wave to be propagated, and transducers 12*a*, 12*b*, 13*a* and 13*b*, mounted at the end or corner portion of the rear surface of the substrate 11, for transmitting and receiving the acoustic wave. A transmitting transducer comprises the transmitting transducer 12*a* placed in an X-axis transmitting area (base point area), and the transmitting transducer 13*a* placed in a Y-axis transmitting area (base point area). A receiving transducer comprises the receiving transducer 12*b*, placed in an X-axis receiving area opposed to the X-axis transmitting area in the substrate 11, for detecting a touch-position of an X coordinate, and the receiving transducer 13*b*, placed in a Y-axis receiving are opposed to the Y-axis transmitting area in the substrate, for detecting a touch-position of a Y coordinate. That is, there are provided a pair of the transmitting transducers 12*a* and 13*a* for detecting respective touch-positions of the X and Y coordinates in the substrate 11, and a pair of the receiving transducers 12*b* and 13*b* for detecting respective touch-positions on the X and Y coordinates of the substrate 11.

The touch panel (position detecting device) according to the present invention further comprises a pair of X-axis reflecting means 14 and a pair of Y-axis reflecting means 15. That is, the pair of X-axis reflecting means 14 include a first X-axis reflecting means 14*a* for reflecting the acoustic wave, which is propagated in a X-axis direction from the transmitting transducer 12*a* in the transmitting area, to a negative (−) Y-axis direction, and a second X-axis reflecting means 14*b*, formed at the sideward section opposed to the first X-axis reflecting means in the substrate 11, for reflecting the acoustic wave, which is propagated in the −Y-axis direction, to a negative (−) X-axis direction. The pair of Y-axis reflecting means 15 also include a first Y-axis reflecting means 15*a* for reflecting the acoustic wave, which is propagated in the Y-axis direction from the transmitting transducer 13*a*, to the −X-axis direction, and a second Y-axis reflecting means 15*b*, formed at the sideward section opposite to the first Y-axis reflecting means of the substrate 11, for reflecting the acoustic wave, which is propagated in the −X-axis direction, to the −Y-axis direction. In this example, each reflecting means is composed of a reflecting array. These reflecting means allows the acoustic wave to be propagated in the X-axis and the Y-axis directions in the display area (i.e. the area surrounded by the reflecting means).

As shown in FIG. 4, the side surface of the substrate 11 (specifically, an edge portion at which the front/rear surfaces and the side surface of the substrate intersect each other) is chamfered over its circumference with a certain radius (R) to form a chamfered portion 16 (i.e. a direction changing portion in the X-axis/−X-axis or Y-axis/−Y-axis direction) having a hemispherical-section. Thus, the acoustic wave from the X-axis transmitting transducer 12*a* are propagated from the rear surface to the front surface of the substrate 11 through the chamfered portion 16, and a part of acoustic wave propagated in the X-axis direction on the front surface of the substrate 11 are reflected to the −Y-axis direction by the first X-axis reflecting means 14*a*. The acoustic wave propagated in the −Y-axis direction on the display area of the substrate 11 is reflected to the −X-axis direction by the second X-axis reflecting means 14*b*. Then, the reflected acoustic wave turns around from the front surface to the rear surface of the substrate 11 through the chamfered portion 16, and it is detected as the touch-position information in the X-axis direction by the receiving transducer 12*b* in the receiving area on the rear surface of the substrate 11. In the same manner as described above, the acoustic wave from the Y-axis transmitting transducer 13*a* is propagated from the rear surface to the front surface of the substrate 11 through the chamfered portion 16, and then reflected by the first Y-axis reflecting means 15*a* and the second Y-axis reflecting means 15*b*. Then, the reflected acoustic wave turns around from the front surface to the rear surface of the substrate 11 through the chamfered portion 16, and it is detected as the touch-position information in the Y-axis direction by the receiving transducer 13*b* placed in the receiving area on the rear surface of the substrate 11. The received signal is analyzed on time base to detect the coordinate of the touch-position.

In this touch panel, no raised portion is practically formed on the front surface of the substrate 11. This enables the touch panel to be enhanced in applicability to thin LCD monitors and to be simplified in structure. In particular, such a touch panel may be simplified in circuit structure and signal processing.

Figure 5:
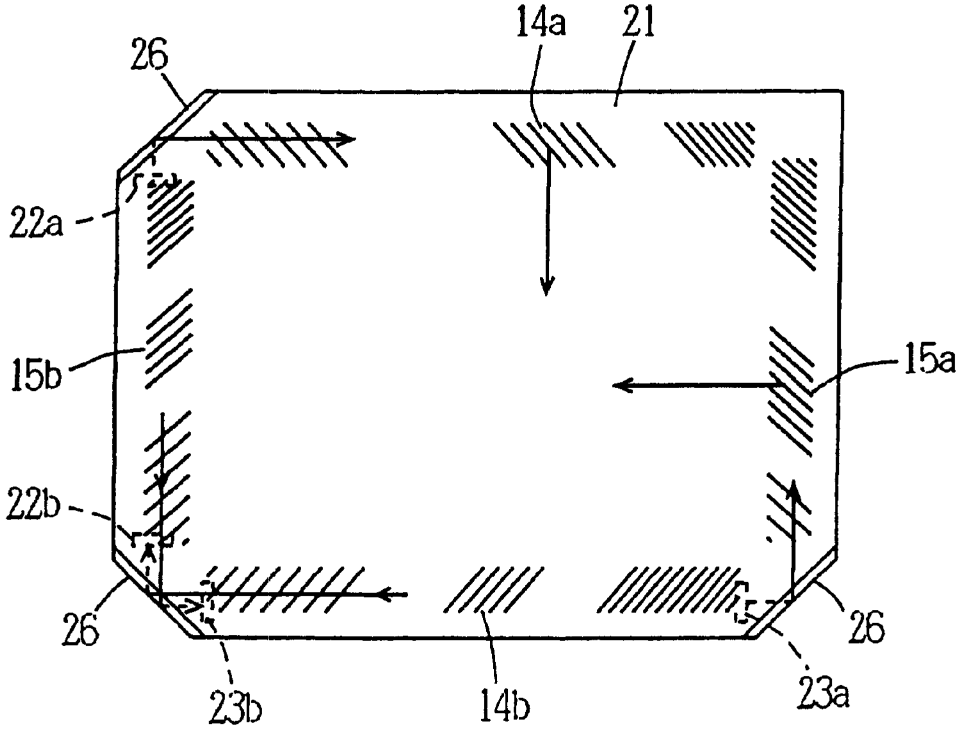
FIG. 5 is a schematic plan view showing another embodiment of the present invention.
Figure 6:
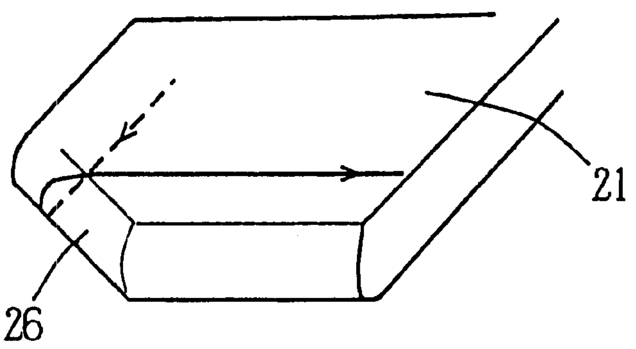
FIG. 6 is a conceptual diagram showing the propagation direction of acoustic wave on a chamfered portion at a corner portion.

FIG. 5 shows a schematic plan view showing another embodiment of the present invention, and FIG. 6 is a conceptual diagram showing the propagation direction of the acoustic wave at the chamfered portion of the corner portion. In these drawings, the same elements as those shown in FIGS. 3 and 4 are identified by the same reference numerals and their description will be omitted. The same elements as in FIGS. 3 and 4 will be defined by the same denote like parts and their description will be omitted.

In this example, corner portions of a substrate 21 are chamfered. Specifically, the corner portions of the planar rectangular substrate 21 are cut off in an aslant direction (at about 45 degree to each adjacent side edge). Then, each end face of the slant corner portions 26 is chamfered with a certain radius (R) to form a chamfered portion 26 having a semi-cylindrical or hemispherical section (i.e. a direction changing portion of X-axis/Y-axis).

As shown in FIG. 6, by the chamfered portion 26 formed at the corner portion at which the adjacent side edges intersect, the acoustic wave propagated in the X-axis or Y-axis direction may be changed to the X-axis or Y-axis direction on the front/rear surfaces of the substrate (propagation medium) 21. Specifically, in the transmitting area of the rear surface of the substrate 21, the acoustic wave is propagated (transmitted or received) at an angle of about 45 degrees to the aforementioned slant corner portion. The acoustic wave from the X-axis transmitting transducer 22*a* and the Y-axis transmitting transducer 23*a* travels spirally on the chamfered portion 26 from the side of the rear surface of the substrate 21. On the front surface, it is propagated in the 90-degree twisted direction to the traveling direction on the rear surface or to the X-axis or Y-axis direction. Then, the acoustic wave is propagated all over the display area by virtue of the X-axis reflecting means 14*a*, 14*b* and the Y-axis reflecting means 15*a*, 15*b* on the front surface of the substrate 21. To the contrary, on the chamfered portion (slant corner portion) 26, the acoustic wave reflected to the −X-axis direction or the −Y-axis travels spirally on the chamfered portion from the side of the front surface of the substrate 21. Then, on the rear surface, it is propagated in the 90-degree twisted direction to the traveling direction on the front surface or to the Y-axis or the X-axis direction, and eventually received by the X-axis receiving transducer 22*b* and the Y-axis receiving transducer 23*b*.

This touch-position detecting device may be simplified in structure by chamfering the corner portion of the substrate with a certain radius to control the transmitting or receiving direction of the transducers. Further, as the abovementioned example, no raised portion is formed on the surface of the substrate so that this touch-position detecting device may be applied to a thin display apparatus to provide a thin image display apparatus.

While a pair of transmitting transducers and a pair of receiving transducers (four transducers in total) are placed on the rear surface of the substrate in the abovementioned example, at least one transducer may be placed on the rear surface of the propagation medium. According to the present invention, the number of transducers may be reduced to two or three by combining the chamfered portion formed at the end face of the acoustic wave propagation medium and the chamfered portion formed at the corner portion. The chamfered portions formed at the end face of the propagation medium and at the corner portion are typically formed at the end portion of adjacent side edges of the propagation medium.

Figure 7:
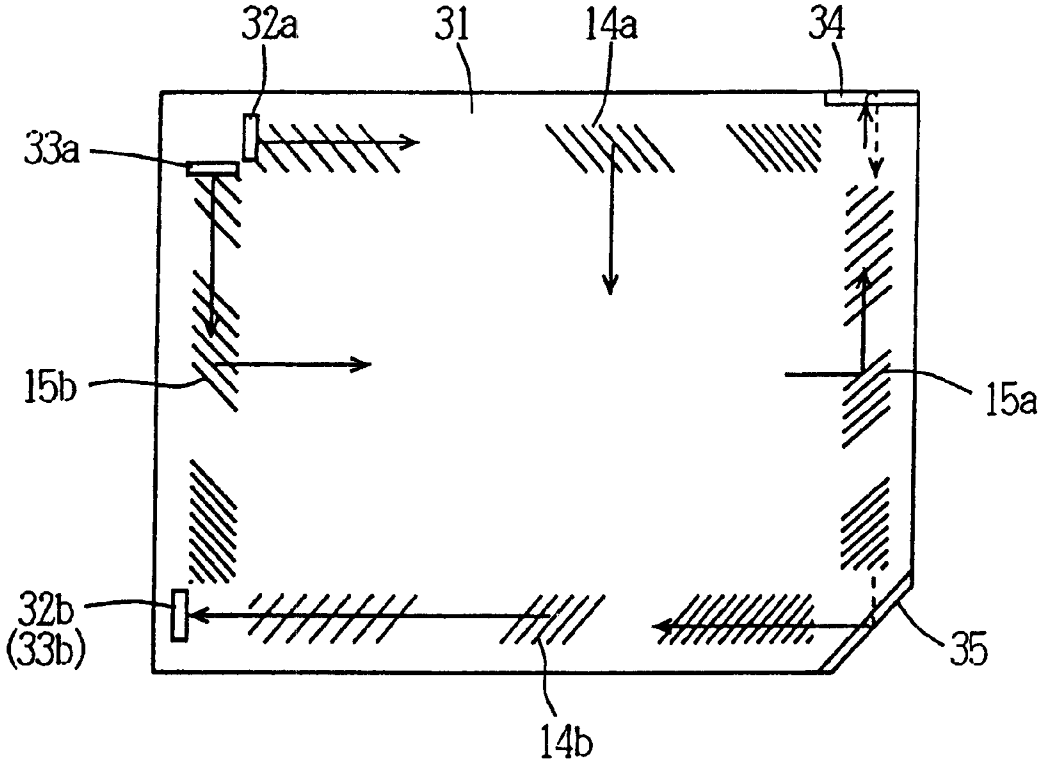
FIG. 7 is a schematic plan view showing an embodiment of the present invention using three transducers.

FIG. 7 is a schematic plan view showing yet another embodiment of the present invention. In this example, three transducers are placed on the front surface of the substrate.

Specifically, an X-axis transmitting transducer 32*a* is placed in the transmitting area for the X-axis direction on the front surface of a substrate 31. The acoustic wave from this transmitting transducer travels in the X-axis direction and then reflected to the −Y-axis direction by the first X-axis reflecting means 14*a*. The reflected acoustic wave are reflected to the −X-axis direction by the second X-axis reflecting means 14*b* and then detected by an X-axis receiving transducer 32*b* placed in the receiving area for the X-axis direction on the front surface of the substrate 31.

On the other hand, a Y-axis transmitting transducer 33*a* is placed in the transmitting area for the Y-axis direction on the front surface of the substrate 31. The acoustic wave from this transmitting transducer travels in the −Y-axis direction and then reflected to the X-axis direction by the second Y-axis reflecting means 15*b*. The reflected acoustic wave is reflected to the Y-axis direction by the first Y-axis reflecting means 15*a*.

A chamfered portion 34 with a certain radius is formed at the end face of the end portion in the traveling direction of the acoustic wave which is associated with the first Y-axis reflecting means 15*a* on the substrate 31 (i.e. in the direction of Y-axis on which a reflecting array as the reflecting means is arranged). A slant-chamfered portion 35 as that of FIG. 6 is formed at a corner portion opposed to the chamfered portion in the Y-axis direction (i.e. a corner portion adjacent to the chamfered portion at the end face).

Thus, the acoustic wave reflected to the Y-axis direction by the first Y-axis reflecting means 15*a* turns around from the front surface to the rear surface of the substrate 31 through the chamfered portion 34, and is propagated in the −Y-axis direction on the rear surface of the substrate 31. Then, the propagated acoustic wave reaches the slant-chamfered portion 35 and travels from the rear surface to the front surface with 90 degrees of torsion. Then, on the front surface of the substrate 31, it passes through the second X-axis reflecting means 14*b* in the −X-axis direction and is eventually received by the X-axis receiving transducer 32*b* placed in the receiving area. Thus, the single receiving transducer 32*b* receives both acoustic waves of the X-axis and Y-axis.

Even where both acoustic waves of the X-axis and Y-axis are detected by a single transducer, X and Y components may be separately detected because a time-lag is caused by difference in length between respective paths of the acoustic wave propagated in the X-axis direction and the acoustic wave propagated to the Y-axis direction.

Figure 8:
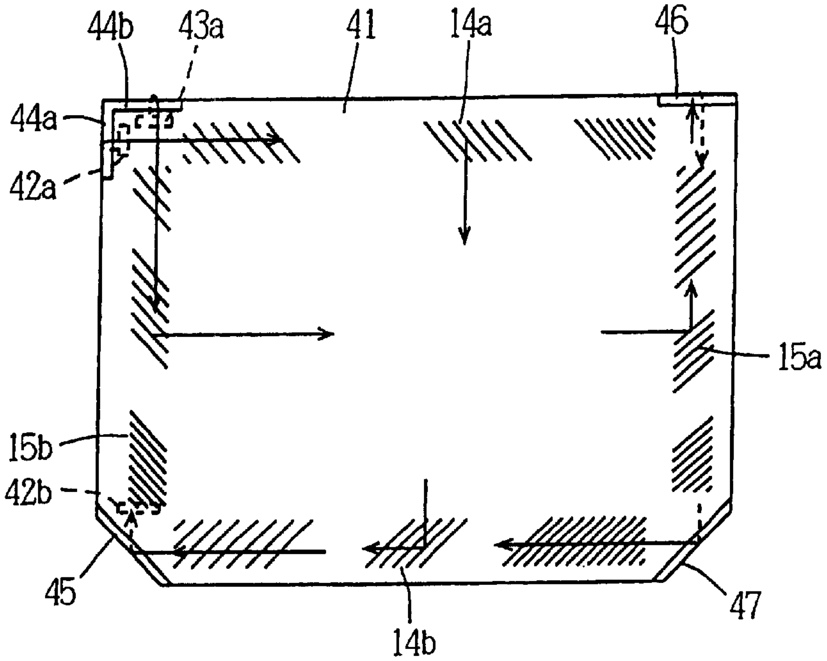
FIG. 8 is a schematic plan view showing another embodiment of the present invention using three transducers.

FIG. 8 is a schematic plan view showing still another embodiment according to the present invention. In this example, three transducers are placed on the rear surface of the substrate.

Specifically, an X-axis transmitting transducer 42*a* is placed in the transmitting area in the X-axis direction on the rear surface of the substrate 41, with facing outward from the side portion of a substrate 41 (i.e. in the −X-axis direction). A chamfered portion 44*a* is formed at the end face (i.e. the end face in the transmitting direction) of the substrate 41 to which the transmitting transducer 42*a* faces. The acoustic wave from the transmitting transducer 42*a* travels in the −X-axis direction, and travels in the X-axis direction on the front surface of the substrate 41 through the chamfered portion 44. Then, it is reflected to the −Y-axis direction by the first X-axis reflecting means 14*a*, and the reflected acoustic wave is reflected to the X-axis direction by the second X-axis reflecting means 14*b*. The acoustic wave reflected to the −X-axis direction travels from the front surface to the rear surface with 90 degrees of torsion, through an slant-chamfered portion 45 formed at the corner portion of the substrate 41 as that of FIG. 6. Then, the acoustic wave travels in the Y-axis direction on the rear surface, and eventually detected by an X-axis receiving transducer 42*b* placed in the receiving area on the rear surface of the substrate 41.

On the other hand, a Y-axis transmitting transducer 43*a* is placed in the transmitting area in the Y-axis direction on the rear surface of the substrate 31 (i.e. in the portion adjacent to the transmitting area for the X-axis direction), with facing outward from the side portion in the −Y-axis direction. The acoustic wave from the transmitting transducer travels in the −Y-axis direction and turns around to the front surface through a chamfered portion 44*b* at the end face. Then, the acoustic wave is reflected to the X-axis direction by the second Y-axis reflecting means 15*b*, and the reflected acoustic wave is reflected to the Y-axis direction by the first Y-axis reflecting means 15*b*.

A chamfered portion 46 with a certain radius is formed at the end face on the substrate 31 in the direction of Y-axis on which the first Y-axis reflecting means 15*a* is arranged. A slant-chamfered portion 47 is also formed at the corner portion on the opposite side of the chamfered portion 46 in the Y-axis direction (i.e. the corner portion adjacent to the chamfered portion at the end face).

Thus, the acoustic wave which has passed through the first Y-axis reflecting means 15*a* in the Y-axis direction turns around from the front surface to the rear surface of the substrate 41 through the chamfered portion 46, and is propagated in the −Y-axis direction on the rear surface of the substrate 41. The propagated acoustic wave reaches the slant-chamfered portion 47, and then travels from the rear surface to the front surface with 90 degrees of torsion. Then, it passes through the second X-axis reflecting means 14*b* in the −X-axis direction on the front surface of the substrate 41, and travels from the front surface to the rear surface with 90 degrees of torsion by the slant-chamfered portion 45. Eventually, it is detected by the X-axis receiving transducer 42*b* placed in the receiving area. This allows the single receiving transducer 42*b* to detect both acoustic waves propagated in the X-axis and Y-axis directions.

Figure 9:
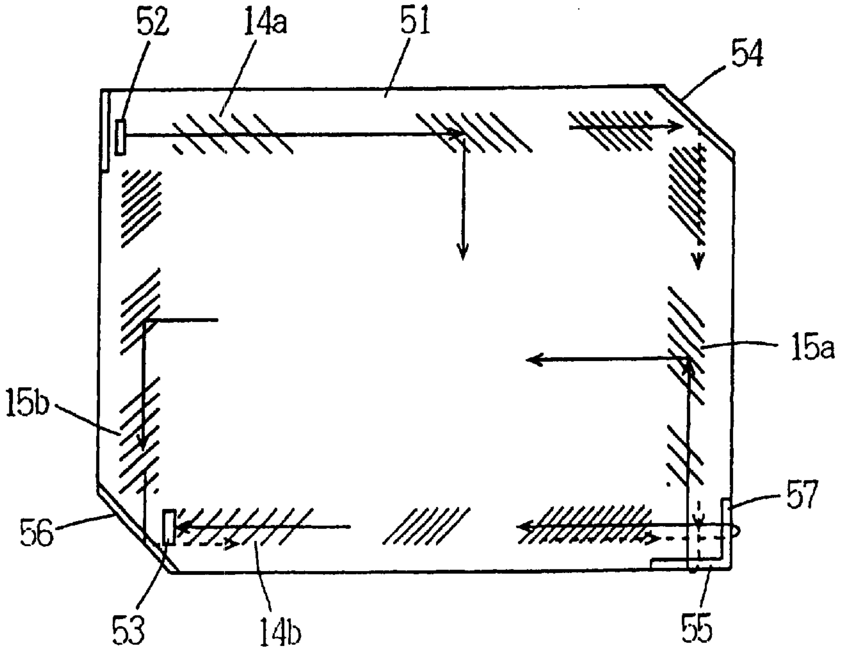
FIG. 9 is a schematic plan view showing an embodiment of the present invention using two transducers.
Figure 10:
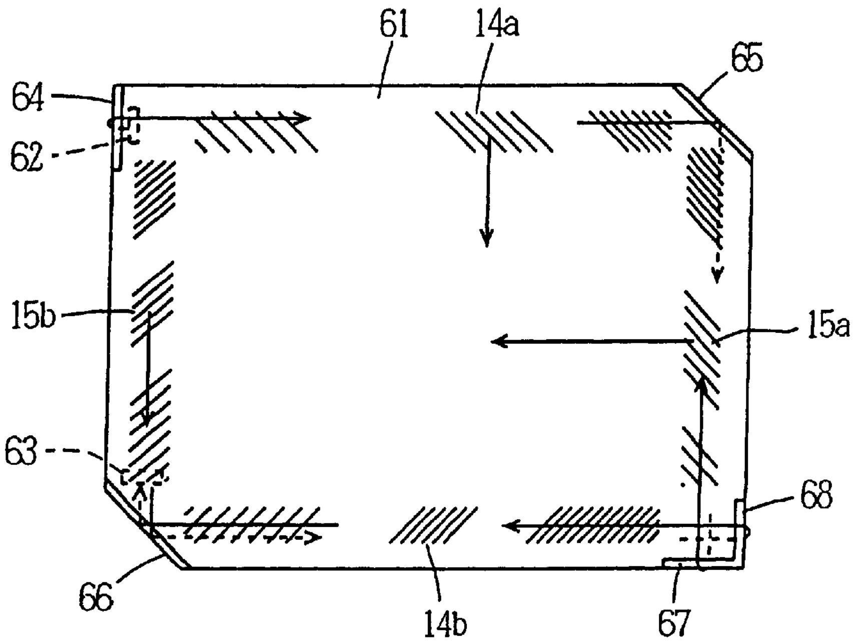
FIG. 10 is a schematic plan view showing another embodiment of the present invention using two transducers.

Further, in the embodiment shown in FIGS. 9 and 10, two transducers (one transmitting transducer and one receiving transducer) are used to detect the data of X-coordinate and Y-coordinate.

Specifically, in the example shown in FIG. 9, a part of the acoustic wave from a transmitting transducer 52 placed in the receiving area on the front surface of a substrate 51 is reflected to the −Y-axis direction by the first X-axis reflecting means 14*a*, and travels in the −X-axis direction by the second X-axis reflecting means 14*b*. This reflected acoustic wave is eventually received by a receiving transducer 53 placed in the receiving area on the front surface of the substrate 51 with facing in the X-axis direction.

On the other hand, the acoustic wave passing through the first X-axis reflecting means 14*a* travels in the X-axis direction on the front surface of the substrate 51, and then turns around to the rear surface with 90 degrees of torsion through the slant-chamfered portion 54 at the corner portion. Then, it travels in the −Y-axis direction on the rear surface, and travels from the rear surface to the front surface through the chamfered portion 55 at the end face, whereafter it is reflected to the −X-axis direction by the first Y-axis reflecting means 15*a*. The acoustic wave reflected to the −X-axis direction is turned in the −Y-axis direction by the second Y-axis reflecting means 15*b*, and turns around from the front surface to the rear surface with 90 degrees of torsion through the slant-chamfered portion 56 at the corner portion, whereafter it travels in the X-axis direction on the rear surface. The acoustic wave traveling in the X-axis direction on the rear surface of the substrate 51 turns around to the front surface of the substrate 51 through the chamfered portion 57 at the end face, and it passes through the second X-axis reflecting means 14*b* to travel in the −X-axis direction on the front surface of the substrate 51, whereafter it is detected by the receiving transducer 53.

In a touch panel shown in FIG. 10, a transmitting transducer 62 is placed in the transmitting area on the rear surface of a substrate 61 with facing outward from the side portion of a substrate 61. The acoustic wave from this transmitting transducer turns around to the front surface through a chamfered portion 64 of the end face, and travels in the X-axis direction on the front surface of the substrate 61. A part of the acoustic wave is reflected to the −Y-axis direction by the first X-axis reflecting means 14*a*, and another part of the acoustic wave travels in the X-axis direction and passes through the first X-axis reflecting means 14*a*.

The acoustic wave reflected to the −Y-axis direction is reflected to the −X-axis direction by the second X-axis reflecting means 14*b*, and it turns around to the rear surface with 90 degrees of torsion through an slant-chamfered portion 66 at the corner portion, whereafter it is received by the transmitting transducer 63 placed with facing in the −Y-axis direction on the rear surface of the substrate 61.

On the other hand, the acoustic wave traveling in the X-axis direction after passing through the first X-axis reflecting means 14*a* turns around from the front surface to the rear surface with 90 degrees of torsion through the slant-chamfered portion 65 of the corner portion. Then, it travels in the −Y-axis direction on the rear surface, and then turns around to the front surface of the substrate 61 through the chamfered portion 67 formed at the end face in the −Y-axis direction, whereafter it travels in the Y-axis direction. The acoustic wave traveling in the Y-axis direction is reflected to the −X-axis direction by the first Y-axis reflecting means 15*a*, and is turned in the −Y-axis direction by the second Y-axis reflecting means 15*b*. The acoustic wave traveling in the −Y-axis direction turns around from the front surface to the rear surface with 90 degrees of torsion through the slant-chamfered portion 66 at the corner portion, and travels in the X-axis direction on the rear surface of the substrate 61. Then, it turns around to the front surface through the chamfered portion 68 formed at the end face in the X-axis direction, and passes through the second X-axis reflecting means 14*b*, whereafter it turns around to the rear surface with 90 degrees of torsion through the slant-chamfered portion 66 of the aforementioned corner portion. Then, it is eventually received by the receiving transducer 63 placed with facing the −Y-axis direction.

According to the present invention, the acoustic waves in both X-axis and the Y-axis directions may be converged by use of the chamfered portion, and these acoustic waves may be branched into X-axis and Y-axis directions. Thus, the number of transducers may be reduced.

Figure 11:
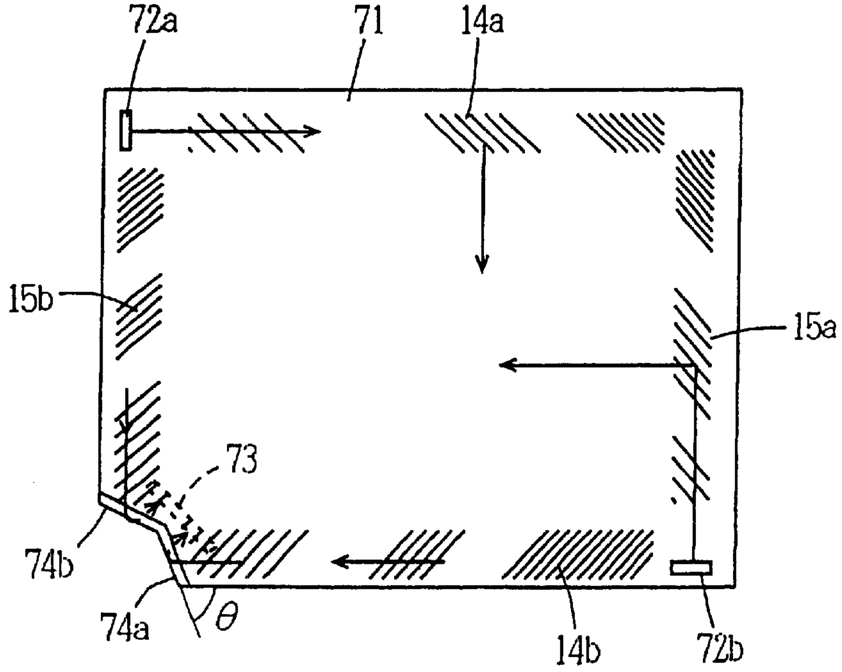
FIG. 11 is a schematic plan view showing another example of the present invention.
Figure 12:
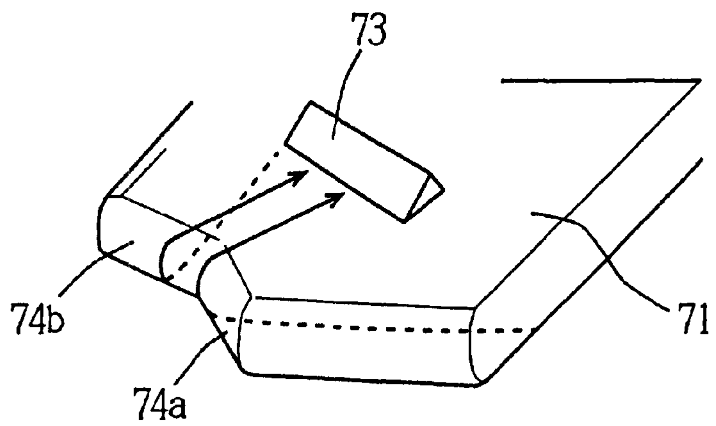
FIG. 12 is a conceptual diagram showing the propagation direction of acoustic wave at a V-shaped chamfered portion of FIG. 11.

FIG. 11 is a schematic plan view showing another example of the present invention, and FIG. 12 is a conceptual diagram showing a propagation direction of acoustic wave at a V-shaped or valley-shaped chamfered portion.

An X-axis transmitting transducer 72*a* and a Y-axis transmitting transducer 72*b* for generating acoustic wave and transmitting the generated acoustic wave in the X-axis and the Y-axis directions are placed in transmitting areas at opposing corner portions among four corner portions at which side edges on the surface of a substrate 71 intersect each other.

A V-shaped or valley-shaped cut portion with an exterior angle of about 135 degrees (e.g. 135±10 degrees) is formed at a corner portion in the reverse directions (in the −X-axis and the −Y-axis directions) of the propagation direction of the acoustic wave from the transmitting transducers 72*a* and 72*b* (the X-axis and the Y-axis transmitting directions). This cut portion is chamfered to form as two chamfered portions (converging direction-changing portions) 74*a* and 74*b* adjacent to each other. A receiving transducer 73 is also placed at an inward region (receiving region) of the chamfered portions 74*a* and 74*b* on the rear surface of the substrate 71 with facing the V-shaped chamfered portions 74*a* and 74*b*.

In this touch panel, the acoustic wave from the X-axis transmitting transducer 72*a* is propagated in the X-axis direction, and then reflected to the −Y-axis direction by the first X-axis reflecting means 14*a*, whereafter it is turned in the −X-axis direction by the second X-axis reflecting means 14*b*, and reaches the chamfered portion 74*a*. On the other hand, the acoustic wave from the Y-axis transmitting transducer 72*b* is propagated in the Y-axis direction, and then reflected to the −X-axis direction by the first Y-axis reflecting means 15*a*, whereafter it is turned in the −Y-axis direction by the second Y-axis reflecting means 15*b*, and reaches the chamfered portion 74*b*. The angle θ of each side edge line of the chamfered portion 74*a* and 74*b* to each adjacent side edge line of the substrate 71 is about 67.5 degrees (e.g. 67.5±5 degrees). The longitudinal axis of the receiving transducer 73 is positioned at about 45 degrees with each adjacent side edge line of the substrate, or at about 90 degrees with the traveling direction of the acoustic wave turning around through each chamfered portion.

As shown in FIG. 12, the acoustic wave traveling in the −X-axis direction turns around from the front surface to the rear surface with 45 degrees of torsion through the slant-chamfered portion 74, and is converged in the receiving transducer 73. The acoustic wave traveling in the −Y-axis direction turns around from the front surface to the rear surface with 45 degrees of torsion through the slant-chamfered portion 74*b*, and is converged in the receiving transducer 73. Thus, both acoustic waves in the X-axis and Y-axis directions are converged by the chamfered portions (converging direction-changing portions) 74*a* and 74*b* so that the both acoustic waves may be received by the single receiving transducer 73 placed in a converging area.

Figure 13:
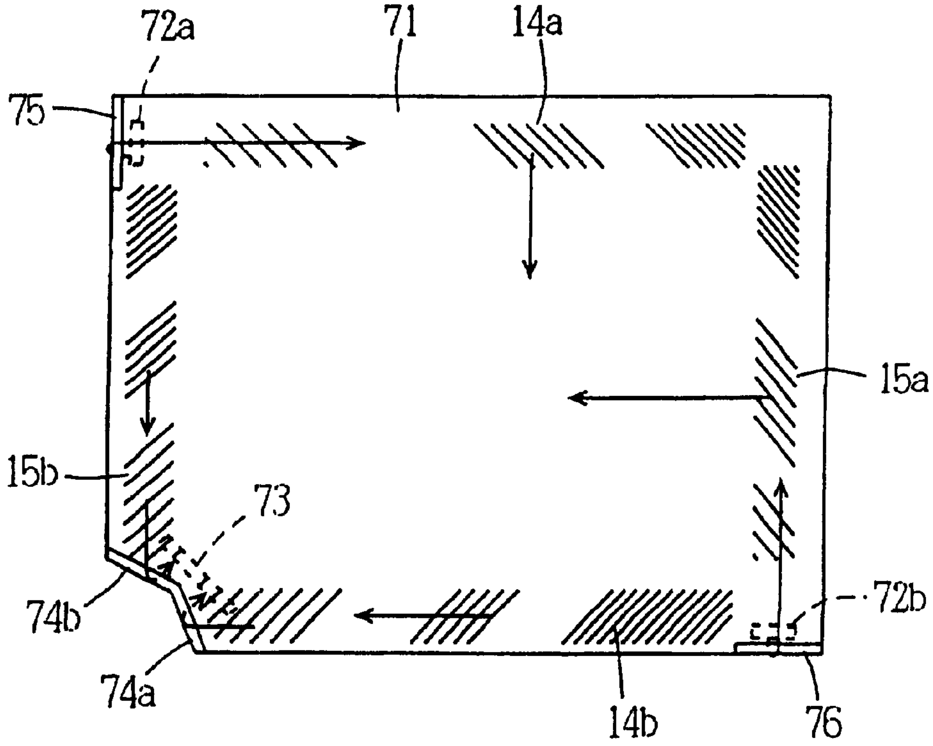
FIG. 13 is a schematic plan view showing a modification of a touch panel shown in FIGS. 11 and 12.

FIG. 13 is a schematic plan view showing a modification of the touch panel shown in FIGS. 11 and 12. In this example, it is constructed in the same manner as shown in FIGS. 11 and 12 except that;

(1) in order to propagate the acoustic wave in the directions of the −X-axis and the −Y-axis and be reversed, the X-axis transmitting transducer 72*a* and the Y-axis transmitting transducer 72*b* are placed with facing outward from the side portion of the substrate (in the directions of the −X-axis and the −Y-axis), respectively, at the transmitting area of the opposite corner regions among four corner portions at which respective side edges on the rear surface of the substrate 71 intersect each other, and (2) chamfered portions 75 and 76 are formed at the end faces in the transmitting directions of the transmitting transducers 72*a* and 72*b* (in the directions of the −X-axis and the −Y-axis), respectively, to make the acoustic wave turn around from the rear surface to the front surface of the substrate 71 and be propagated in the directions of the X-axis and the Y-axis.

Figure 14:
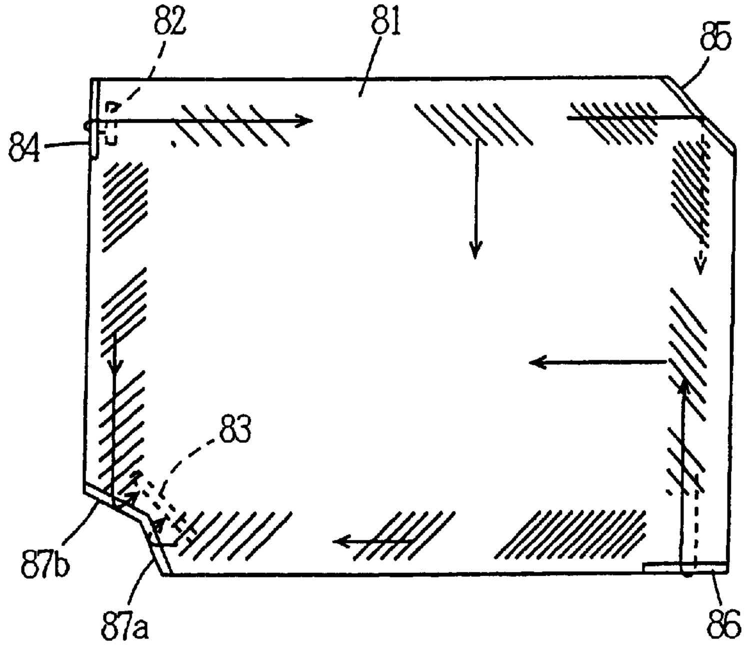
FIG. 14 is a schematic plan view showing an example using two transducers.
Figure 15:
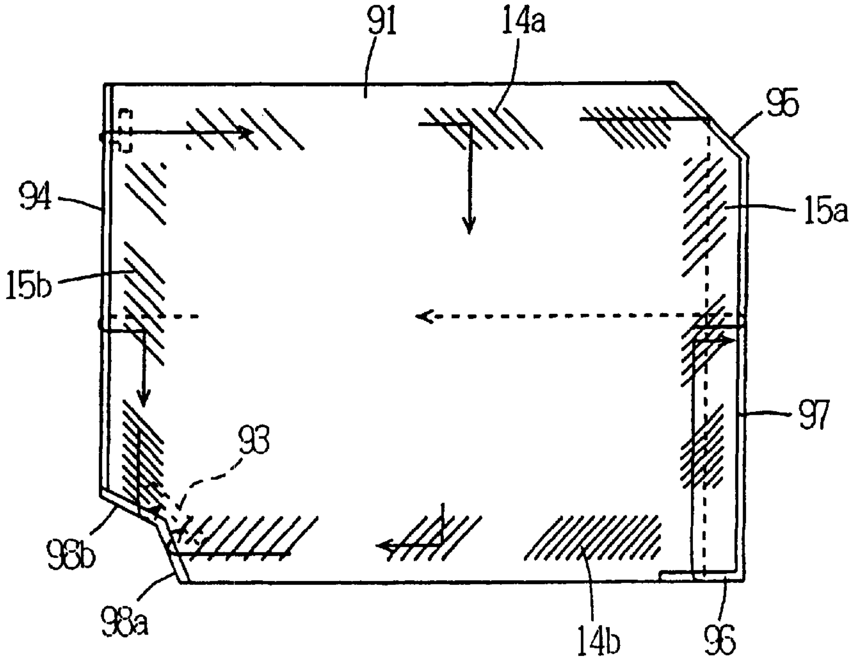
FIG. 15 is a schematic plan view showing an example using two transducers.

FIGS. 14 and 15 are schematic plan views showing examples using two transducers.

In a touch panel shown in FIG. 14, the acoustic wave from a transmitting transducer 82 placed in the transmitting area on the rear surface of a substrate 81 with facing outward from the side portion of the substrate turns around to the front surface of the substrate 81 through a chamfered portion 84 at the end face, and travels in the X-axis direction. A part of the acoustic wave traveling in the X-axis direction is reflected to the −Y-axis direction by the first X-axis reflecting means 14*a*, and the reflected acoustic wave is reflected to the −X-axis direction by the second X-axis reflecting means 14*b*, whereafter it reaches a V-shaped chamfered portion 87*a* at the corner portion.

A part of the acoustic wave passes through the first X-axis reflecting means 14*a*, and reaches a chamfered portion 85 at the corner portion. Then, it turns around from the front surface to the rear surface with 90 degrees of torsion, and travels in the −Y-axis direction on the rear surface. Then, it turns around from the rear surface to the front surface through a chamfered portion 86 at the end face, and is propagate in the Y-axis direction on the front surface, whereafter it is reflected to the −X-axis direction by the first Y-axis reflecting means 15*a*. The acoustic wave reflected to the −X-axis direction is guided to the −Y-axis direction by the second Y-axis reflecting means 15*b*, and reaches a V-shaped chamfered portion 87*b* at the corner portion.

The X-axis acoustic wave, which has been guided to the −X-axis direction and reached the chamfered portion 87*a* of the V-shaped chamfered portion, and the Y-axis acoustic wave, which has been guided to the −Y-axis direction and reached the chamfered portion 87*b* of the V-shaped chamfered portion, turns around from the front surface to the rear surface with 45 degrees of torsion through the V-shaped chamfered portions 87*a* and 87*b*, and they are converged. Eventually, they are received by the receiving transducer 83 placed in the converging area.

In the device shown in FIG. 15, the acoustic wave from a transmitting transducer 92 placed in the transmitting area on the rear surface of a substrate 91 with facing outward from the side portion of the substrate turns around to the front surface of the substrate 91 through a chamfered portion 94 at the end face, and travels in the X-axis direction. A part of the acoustic wave traveling in the X-axis direction is reflected to the −Y-axis direction by the first X-axis reflecting means 14*a*, and the reflected acoustic wave is reflected to the −X-axis direction by the second X-axis reflecting means 14*b*, whereafter it reaches a V-shaped chamfered portion 98*a*.

A part of the acoustic wave passes through the first X-axis reflecting means 14*a*, and reaches a chamfered portion 95 at the corner portion. Then, it turns around from the front surface to the rear surface of the substrate 91 with 90 degrees of torsion, and travels in the −Y-axis direction on the rear surface. Then, it turns around from the rear surface to the front surface of the substrate 91 through a chamfered portion 96 at the end face, and is propagated in the Y-axis direction on the front surface, whereafter it is reflected to the −X-axis direction by the first Y-axis reflecting means 15*a*. The acoustic wave reflected to the −X-axis direction turns around from the front surface to the rear surface of the substrate 91 through a chamfered portion 97 at the side end face, and is propagated in the −X-axis direction on the rear surface. Then, it turns around from the rear surface to the front surface of the substrate 91 through the chamfered portion 94 at the side end face on the opposite side, and is propagate in the X-axis direction on the front surface. Then, it is reflected to the −Y-axis direction by the second Y-axis reflecting means 15*b*, and reaches a V-shaped chamfered portion 98*b*.

The X-axis acoustic wave, which has been guided to the −X-axis direction and reached the chamfered portion 98*a* of the V-shaped chamfered portion, and the Y-axis acoustic wave, which has been guided to the −Y-axis direction and reached the chamfered portion 98*b* of the V-shaped chamfered portion, turn around from the front surface to the rear surface of the substrate 91 with 45 degrees torsion through the V-shaped chamfered portions (converging direction-changing portions) 98*a* and 98*b*, and they are converged. Eventually, they are received by the receiving transducer 93 placed in the converging area.

The transmitting transducer and the receiving transducer are compatible with each other. For example in the device shown in FIGS. 11 and 12, when the receiving transducer 73 is used as a transmitting transducer and the transmitting transducers 72*a* and 72*b* are used as a receiving transducer, by making the acoustic wave from the transmitting transducer placed in the branching area branch into the X-axis and the Y-axis directions by the V-shaped chamfered portion, both acoustic waves from the X-axis and Y-axis direction may be received by the receiving transducer.

Figure 16:
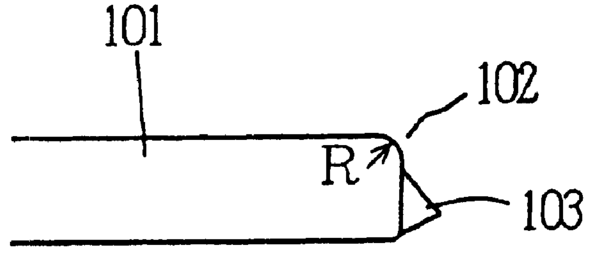
FIG. 16 is a schematic sectional view showing yet another example of the present invention.

FIG. 16 is a schematic sectional view showing still another example. In this example, a transducer is placed at the side surface of the substrate. Specifically, a chamfered portion 102 is formed by chamfering in the corner portion (end edge portion) at which at least on one of the front and rear surfaces of a substrate (acoustic wave propagation medium) 101 and the side surface of the substrate 101 intersect each other, and a transmitting or receiving transducer 103 is placed at the side surface of the substrate 101.

In this touch panel, the acoustic wave from the transmitting transducer 103 may be turned around from the side surface to the front surface (or the rear surface) of the substrate 101. Further, the acoustic wave propagated form the front surface (or the rear surface) may be turned around to the side surface and received by the receiving transducer 103. This may surely prevent from forming raised portions on the front and rear surfaces of the substrate 101.

Figure 17:
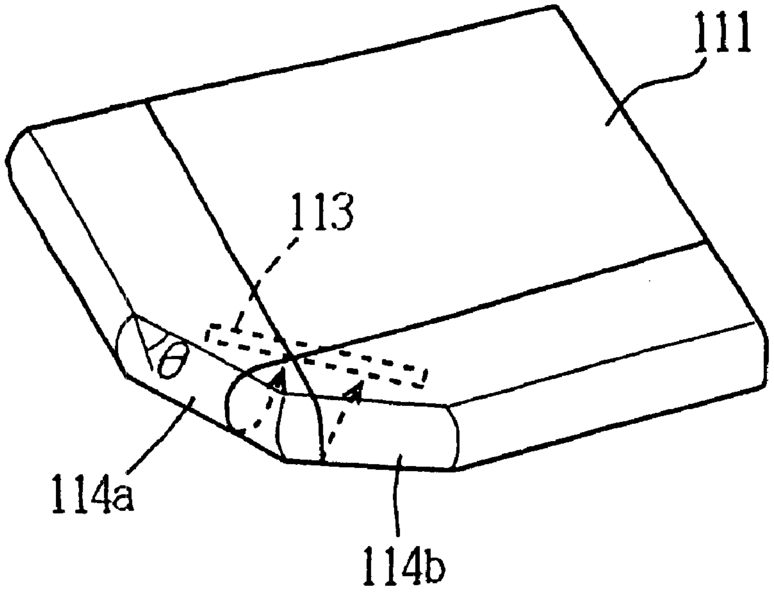
FIG. 17 is a conceptual diagram showing the propagation direction of acoustic wave at a chevron-shaped chamfered portion.

As shown in FIG. 17, in a touch panel (touch-position detecting device) of the present invention, for allowing the traveling direction of acoustic wave to be propagated from one surface to another surface at the corner area of the substrate with a predetermined torsion angle, the corner area of the substrate may be provided with an chevron-shaped raised portion (chevron-shaped chamfered portion or diverging direction-changing portion) which projects outward in the triangular or chevron shape and has a chamfered end face, in the different manner to the V-shaped or valley shaped cut portion. FIG. 17 is a conceptual diagram showing the propagation direction of the acoustic wave in the chevron-shaped chamfered portion.

In this example, the corner area of a substrate 111 is formed with an chevron-shaped chamfered portion (diverging direction-changing portion) comprising an slant-chamfered portion 114*a*, which intersects to the traveling direction of the acoustic wave traveling in the −X-axis direction (or the X-axis direction) along the side portion (for example, the area provided with the X-axis reflecting means), and an slant-chamfered portion 114*b*, which intersects to the traveling direction of the acoustic wave traveling in the −Y-axis direction (or the Y-axis direction) along the side portion (for example, the area provided with the Y-axis reflecting means). The chevron-shaped chamfered portion is formed symmetrically with the aforementioned V-shaped chamfered portion, and the angle between the slant-chamfered portion 114*a* and the slant-chamfered portion 114*b* is formed with about 135 degrees of interior angle (e.g. 135±10 degrees). The angle θ between respective slant-chamfered portions 114*a* and 114*b* and respective adjacent side edge lines of the substrate 111 is about 22.5 degrees (e.g. 22.5±5 degrees).

Thus, the acoustic wave traveling in the −X-axis direction (or the X-axis direction) turns around from the front surface to the rear surface with 45 degrees of torsion through the slant-chamfered portion 114*a*, and it is converged in the receiving transducer 113. The acoustic wave traveling in the −Y-axis direction (or the Y-axis direction) also turns around from the front surface to the rear surface with 45 degrees of torsion through the slant-chamfered portion 114*b*, and it is converged in the receiving transducer 113. Thus, both acoustic wave in the X-axis and Y-axis directions may be converged by the chamfered portions 114*a* and 114*b*, and received by the single receiving transducer 113 placed in the converging area.

As mentioned above, the touch panel (touch-position detecting device) of the present invention comprises a medium allowing acoustic wave to be propagated in the X-axis and Y-axis directions, at least one transmitting transducer, mounted to the propagation medium, for generating the acoustic wave in the X-axis and Y-axis directions, and a chamfered portion (direction changing portion), formed at the end face and/or the corner portion of the propagation medium, for making the acoustic wave from the transmitting transducer turn around to the front or rear surface of the propagation medium. Thus, the acoustic wave turning around through the chamfered portion may be received by at least one receiving transducer mounted on the propagation medium to detect the X- and Y-coordinates of the touch-position.

In the present invention, the radius (R) of the chamfered portion of the propagation medium may be selected depending on the thickness of the substrate. For example, it may be 0.5 mm or more (e.g. 0.5 to 5 mm, preferably 0.7 to 5 mm), preferably 1 mm or more (e.g. 1 to 3 mm), and typically 1.2 to 2.5 mm.

The material of the propagation medium is not particularly limited as long as the propagation medium allows acoustic wave (surface acoustic wave, in particular surface ultrasonic wave) to be propagate. The available material may include a glass (soda lime glass, borosilicate glass, crown glass, barium-contained glass, zirconium-contained glass, strontium-contained glass, or the like), ceramics, metal (aluminum or the like), or a polymer having a low sound attenuation rate. In the present invention, it may be the case that the propagation distance of the acoustic wave from the transmitting transducer to the receiving transducer becomes long. Thus, it is preferable to form the substrate (propagation medium) from a low-loss or low-attenuation, for example a material having 0.5 dB/cm or less (particularly 0.3 dB/cm or less) of attenuation coefficient when Rayleigh wave with 5.53 MHz of frequency is propagated (e.g. borosilicate glass, barium-contained glass, zirconium-contained glass, strontium-contained glass or the like).

The propagation medium is typically formed to have a smooth surface, and is typically made by a flat panel or a curved panel (especially, low curvature panel).

As a transducer for transmitting or receiving acoustic wave, a conventional transducer such as a wedge-type transducer composed of a piezoelectric resonator and triangular-section plastic may be applied. Each structure of the transmitting transducer and the receiving transducer may be substantially the same except different use conditions.

In the present invention, by chamfering (processing for providing a radius (R) to) the end face of the propagation medium, the traveling direction of the acoustic wave may be reversed (changing in the X-axis/−X-axis directions or the Y-axis/−Y-axis directions) on the front and rear surfaces of the propagation medium without changing the substantial traveling direction, while by chamfering the corner portion, the traveling direction of the acoustic wave may be reversed with changing the traveling direction (changing in X-axis/Y-axis directions) on the front and rear surfaces of the propagation medium. Further, by forming the V-shaped (valley-shaped) or chevron-shaped chamfered portion at the corner portion, the acoustic wave traveling on one surface of the propagation medium may be converged (converging direction-changing), or be branched (branching direction-changing) on the other surface. To achieve this, a desirable portion of the end face and/or the corner portion of the propagation medium to which the acoustic wave turns around, or at least part (or entire circumference) of the end face of the propagation medium, or at least one corner portion (or all corner portions) of four corner portions of the propagation medium may be chamfered.

As described above, by forming a chamfered portion at the end face of the propagation medium, the acoustic wave may be reversed between the front and rear surfaces of the propagation medium (i.e. traveled in the reverse direction). Further, by forming an intersecting chamfered portion at the corner portion of the substrate, the acoustic wave may be changed in the traveling direction at a particular angle, e.g. about 90 degrees, between the front and rear surfaces of the propagation medium.

It is not essential to receive the X-axis and Y-axis acoustic waves by a single transducer by use of the adjacent V-shaped or chevron-shaped chamfered portions at the corner portion. That is, by individual transducers may separately receive the X-axis and Y-axis acoustic waves by adequately selecting each angle of the chamfered portions adjacent to each other.

Further, in order to receive the acoustic wave from the transmitting transducer by the receiving transducer more effectively, the width of the chamfered portion intersecting to the traveling direction of the acoustic wave (especially ultrasonic wave) is preferably larger than the length (width) of the transducer. More specifically, when the traveling direction of the acoustic wave intersects the chamfered portion at right angle (for example, when the chamfered portion is formed in the end face of the side portion of the substrate), the width of the chamfered portion is formed larger than the width of the transducer. When the traveling direction of the acoustic wave deviates an by angle $\theta$ from the direction orthogonal to the chamfered portion (for example, when the chamfered portion is formed at the corner portion of the substrate), the width of the chamfered portion is formed larger than the width of the transducer×cos $\theta$.

The radius (R) of the chamfered portion of the propagation medium typically has a semicircle shape in section (spherical-finished).

Typically, means for generating acoustic wave includes a bulk wave generating means composed of a piezoelectric resonator (e.g. ceramic piezoelectric resonator, polymer piezoelectric resonator), and bulk wave created by the bulk wave generating means is converted into acoustic wave by an acoustic wave transducer (e.g. a wedge transducer).

Available acoustic wave may include the acoustic wave having at least one transmitting component selected from a longitudinal mode, a horizontally polarized shear mode having an oscillating direction parallel to a surface, and a vertically polarized shear mode having an oscillating direction in a plane perpendicular to the surface. A desirable acoustic wave is a Rayleigh-type wave, particularly surface acoustic wave (more particularly, surface ultrasonic wave).

It is not essential for the reflecting means to formed of the reflecting array, and the reflecting means may be formed of one or a plurality of reflecting members transaudient of a part of acoustic wave (e.g. surface acoustic wave). The reflecting array forming the reflecting means may include an assembly of reflecting array elements (a group of reflecting arrays) formed as raised portions (raised portions made of glass, ceramics or metal) or grooves on the surface of the propagation medium. Typically, each reflecting array element is formed to be substantially parallel with each other, and the angle made by the reflecting members or each reflecting array element may be about 45 degrees to the X-axis or Y-axis in order to allow acoustic wave to be propagated in the X-axis and Y-axis directions. In the reflecting array, when the acoustic wave is reflected to the X-axis or Y-axis direction, the pitch of the array elements is formed denser as going along the traveling direction of the acoustic wave travel. The reflecting member and the reflecting array may be formed by means of the screen-printing process.

The reflecting means comprises a series of elements (first reflecting means) placed along at least part of the traveling path of the acoustic wave from the acoustic wave generating means, and a series of elements (second reflecting means) placed along the traveling path passing over the axis of the reflected direction of the acoustic wave from the first reflecting means.

A method for detecting touch-positions will also be described herein, which comprises the steps of exciting a bulk wave by a piezoelectric resonator or the like, generating an acoustic wave having a acoustic mode converted from the bulk wave, propagating the acoustic wave to the rear surface or the front surface of the propagation medium by making the acoustic wave turn around between the front and rear surfaces at the end face or the corner portion of a propagation medium, and detecting a perturbation of the acoustic wave on the surface of the propagation medium (fluctuation of the acoustic wave caused by a touch). In this method, between the step for exciting and the step for propagating the acoustic wave, a reflecting step for reflecting a part of the acoustic wave to propagate the acoustic wave to the front or rear surface of the propagation medium may be interposed.

This method may apply a method for propagating an acoustic wave, which is generated by the acoustic wave generating means, along the X-axis and Y-axis on the front surface of a propagation medium by use of X-axis reflecting means and Y-axis reflecting means so as to detect the perturbation of the acoustic wave on the front surface of the propagation medium, the method comprising the steps of generating an acoustic wave on the front, rear, or side surface of the propagation medium, making the generated acoustic wave or the reflected acoustic wave by the X-axis reflecting means or the Y-axis reflecting means turn around and bidirectionally propagate between the front and rear surfaces of the propagation medium each other through a chamfered portion formed at the end face or corner portion of the propagation medium.

The touch panel device of the present invention may be connected with a sound generating means or an alarm means for making sound in response to a touch on the front surface of the propagation medium, display means for displaying a touch-position, control means for controlling an image in the display area in response to the touch-position (e.g. means for changing or erasing a display image), and control means for other driving devices.

INDUSTRIAL APPLICABILITY

The touch panel (touch-style coordinates input device) according to the present invention may be suitably applied to regular displays having a curved surface, such as CRT as well as displays having a flat or low curvature panel surface, such as a liquid crystal display or plasma display.

The touch panel according to the present invention may prevent from forming raised portions on the front surface of the propagation medium, so that the applicability to thin display apparatuses (LCD monitor or the like) may be enhanced, and the structure may be simplified. In addition, by using the chamfered portion, the number of transducers may be reduced to two or three. Further, the circuit structure and the signal processing may be simplified.

EXAMPLE

With reference to examples, the present invention will now be described in detail, but the present invention is not limited these examples.

Example 1

A touch panel for 10.4-inch LCD monitor having the structure shown in FIG. 3 was fabricated using 2.8 mm thickness of soda glass substrate. As a transducer, a plastic wedge-shaped transducer (of about 3 mm height), to which a piezoelectric resonator (of 5.5 MHz resonance frequency) is mounted by an ultraviolet-ray setting adhesive, was applied. A reflecting array was formed by providing a pair of the reflecting array for oscillating side and the reflecting array for receiving side on the peripheral portion of the surface of the glass substrate respectively in the X-axis and Y-axis directions using glass paste by the screen-printing process and firing at 450° C., based upon the Japanese Patent Laid-Open Publication No. 61-239322.

Electric wire cables were connected with the electrode of each piezoelectric resonator by soldering, and these electric wire cables were then connected to a controller through a connector. As a controller, a commercially available ultrasonic system controller (1055E101, made by Touch Panel Systems Co.) was applied. A personal computer was connected to the controller in order to analyze received signals and detect input positions.

Comparative Example 1

A touch panel for LCD monitor was fabricated in the same manner as in the Example 1 except that a transducer was mounted on the front surface of the substrate.

Comparative Example 2

A touch panel for LCD monitor was made in the same manner as in the Example 1 except that a slant surface descended outward was formed (slope-processing) at the end face of the front surface of the substrate (at transmitting and receiving areas) and a transducer was mounted on the slant surface to reduce the height of a raised portion caused by the transducer.

Then, by measuring the overall size of the touch panel, the presence or height of raised portions on the front and rear surfaces of the substrate, and the relative signal strength, the result shown in Table 1 was obtained. The relative signal strength was calculated based on the signal strength in the Comparative Example 1 as 100.

TABLE 1

| | Example 1 | Comparative Example. 1 | Comparative Example. 2 |
|---|---|---|---|
| Outside dimension | ○ 238 × 184.5 mm | Δ 240.5 × 187 mm | Δ 240.5 × 187 mm |
| Height of raised portion on front surface | ◎ None | X about 3 mm | Δ about 1 mm |
| Height of raised portion on rear surface | Δ About 3 mm | ◎ None | ◎ None |
| Relative signal strength | ○ About 90 | ○ 100 | Δ about 40 to 70 |

As shown in Table 1, the Example shows high applicability to the LCD monitor because almost no lowered signal strength, high ability for minimizing overall size of the touch panel, and no raised portion on the front surface of the substrate. While about 3 mm of raised portion is seen on the rear surface of the substrate, no problem will be practically caused because a gap may be arranged between the rear surface of the panel and the LCD display apparatus.

In recent years, the LCD monitor has become extremely thin and its overall size has been extremely small to the display area. A touch panel for such a LCD monitor is required to have smaller outer diameter than that of the display area and to be thin. The touch panel according to the present invention may sufficiently meet with such requirements.

Example 2

A touch panel for 15-inch dome-shaped CRT monitor having the structure shown in FIG. 5 was fabricated using 2.8 mm thickness of soda glass substrate. A transducer and reflecting array were formed in the same manner as described above. Electric wire cables were connected to electrodes of each piezoelectric resonator by soldering, and these electric wire cables were connected to a controller through a connector. As a controller, a commercially available ultrasonic system controller (1055E101, made by Touch Panel Systems Co.) was applied. A personal computer was connected to the controller to analyze received signals and detect input position.

A CRT of the CRT monitor has a rectangular shape including four chamfered corner portions. In the touch panel corresponding to this CRT, transducers are generally placed in the three corner portions. However, in the chamfered rectangular substrate, since the corner portions for mounting the transducers are formed with the radius (R), the slope processing is difficult to apply. Thus, a touch panel was not fabricated for a slope-processed substrate.

Comparative Example 3

The touch panel for CRT monitor was made in the same manner as in the Example 2 except that the transducer was mounted to the front surface of the substrate.

Then, by evaluating the touch panel in the same manner as in the Example 1, the result shown in Table 2 was obtained. The relative signal strength was calculated based on the signal strength in the Comparative Example 3 as 100.

TABLE 2

| | Comparative Example. 1 | Comparative Example. 2 |
|---|---|---|
| Outside dimension | 328 × 262 mm | 328 × 282 mm |
| Height of raised portion on front surface | ⊚ None | X about 3 mm |
| Height of raised portion on rear surface | Δ about 3 mm | ⊚ None |
| Relative signal strength | ○ about 70 | ○ 100 |

As is apparent from Table 2, the touch panel in the Example had no raised portion on the front surface of the substrate and obtained the signal strength free of practical problem. While the raised portion is seen on the rear surface of the substrate, no problem will be practically caused because about 3 mm of gap may be arranged between the rear surface of the panel and the LCD display apparatus.

In recent years, CRT monitors tends to be flatten with a larger curvature radius. The front cover of the monitor is not swollen largely from the CRT, and the gap between CRT and the front cover has tended to be smaller. The touch panel of the present invention may sufficiently meet with such requirements.

We claim:

1. A touch panel comprising:

a substrate capable of propagating an acoustic wave, the substrate having a first surface, a second surface and a connecting surface, the connecting surface interconnecting the first surface and the second surface and being curved; and a transducer mounted on the second surface and positioned for transmitting an acoustic wave from the second surface to the first surface via the connecting surface, wherein the transducer is positioned such that the acoustic wave travels in a first direction on the second surface and a second direction on the first surface, the first direction being approximately perpendicular to the second direction.

2. A touch panel comprising:

a substrate capable of propagating an acoustic wave, the substrate having a first surface, a second surface and a connecting surface, the connecting surface interconnecting the first surface and the second surface and being curved, wherein the first and second surfaces are parallel to each other, the substrate further comprising a plurality of edges connecting the first and second surfaces such that the substrate is substantially rectangular and the connecting surface interconnects two adjacent edges; and a transducer mounted on the second surface and positioned for transmitting an acoustic wave from the second surface to the first surface via the connecting surface.

3. A touch panel as recited in claim 2, wherein the connecting surface and the adjacent edges are formed at about 45 degrees to each other.

4. A touch panel as recited in claim 3, wherein the transducer transmits the acoustic wave at approximately a 45 degree angle to the connecting surface.

5. A touch panel comprising:

a substrate capable of propagating an acoustic wave, the substrate having a first surface, a second surface and a connecting surface, the connecting surface interconnecting the first surface and the second surface and being curved, and wherein the first surface and the second surface are parallel to each other; and a transducer mounted on the second surface and positioned for transmitting an acoustic wave from the second surface to the first surface via the connecting surface.

6. A touch panel as recited in claim 5, wherein the curved connecting surface is semi-cylindrical.

7. A touch panel comprising:

a substrate capable of propagating an acoustic wave, the substrate having a first surface, a second surface and a connecting surface, the connecting surface interconnecting the first surface and the second surface and being semi-cylindrical; and a transducer mounted on the second surface and positioned for transmitting an acoustic wave from the second surface to the first surface via the connecting surface.

8. A touch panel comprising:

a substrate capable of propagating an acoustic wave, the substrate having a first surface, a second surface parallel to said first surface, and a connecting surface, the connecting surface interconnecting the first surface and the second surface and being curved; and a transducer mounted on the second surface and positioned for propagating an acoustic wave in a first direction along the second surface, along the curved connecting surface to the first surface, and in a second direction along the first surface, the second direction being a different direction than the first direction.

9. The touch panel of claim 8 wherein each of said first and second surfaces are planar.

10. The touch panel of claim 9 wherein said curved connecting surface defines a semicircular arcuate surface to enable an acoustic wave propagated in a first direction along the second planar surface to be transmitted to said first planar surface for propagation in said second direction along said first planar surface.

11. The touch panel of claim 10 wherein said first and second directions are substantially opposite to each other.

* * * * *